US010078289B2

(12) United States Patent
Sandler et al.

(10) Patent No.: US 10,078,289 B2
(45) **Date of Patent: *Sep. 18, 2018**

(54) METHOD AND SYSTEM FOR ACTIVE DECREASE OF GHOST APPEARANCE

(71) Applicant: HP Indigo B.V., Amstelveen (NL)

(72) Inventors: Mark Sandler, Rehovot (IL); Shai Lior, Rehovot (IL)

(73) Assignee: HP Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,076

(22) Filed: Nov. 29, 2016

(65) Prior Publication Data

US 2017/0082941 A1 Mar. 23, 2017

Related U.S. Application Data

(63) Continuation of application No. 12/598,076, filed as application No. PCT/US2007/010427 on Apr. 30, 2007, now Pat. No. 9,535,359.

(51) Int. Cl.

| | |
|---|---|
| ***G06T 5/00*** | (2006.01) |
| ***H04N 1/407*** | (2006.01) |
| ***H04N 1/409*** | (2006.01) |
| ***G03G 15/043*** | (2006.01) |
| ***G03G 15/041*** | (2006.01) |
| ***G03G 15/10*** | (2006.01) |
| ***G03G 15/00*** | (2006.01) |

(52) U.S. Cl.

CPC ....... *G03G 15/043* (2013.01); *G03G 15/0415* (2013.01); *G03G 15/10* (2013.01); *G03G 15/5062* (2013.01); *G03G 2215/00755* (2013.01); *G03G 2215/00759* (2013.01)

(58) Field of Classification Search

CPC .. G03G 15/043; G03G 15/0415; G03G 15/10; G03G 15/5062; G03G 2215/00755; G03G 2215/00759

USPC .............................. 399/51, 50; 358/3.26, 1.9

See application file for complete search history.

(56) References Cited

U.S. PATENT DOCUMENTS

| | | | | |
|---|---|---|---|---|
| 4,641,158 | A | 2/1987 | Takeuchi | |
| 4,937,662 | A | 6/1990 | Matsunawa et al. | |
| 5,606,398 | A | 2/1997 | Ender | |
| 6,266,495 | B1 | 7/2001 | Yuminamochi et al. | |
| 7,038,816 | B2 | 5/2006 | Klassen et al. | |
| 2001/0030680 | A1 | 10/2001 | Mitsuya et al. | |
| 2003/0058460 | A1 | 3/2003 | Denton et al. | |
| 2004/0056945 | A1 * | 3/2004 | Takamatsu | B41J 2/45 347/237 |
| 2004/0190020 | A1 | 9/2004 | Schuhrke et al. | |
| 2004/0223789 | A1 | 11/2004 | Inami et al. | |
| 2005/0128281 | A1 * | 6/2005 | Gong | G03G 15/043 347/224 |
| 2006/0001911 | A1 | 1/2006 | Viassolo et al. | |

FOREIGN PATENT DOCUMENTS

| | | | |
|---|---|---|---|
| EP | 1187457 | A3 | 3/2002 |
| JP | 2005208616 | A | 8/2005 |

* cited by examiner

*Primary Examiner* — Quang N Vo

(74) *Attorney, Agent, or Firm* — Dicke Billig & Czaja PLLC

(57) ABSTRACT

A method of operating a printing system includes determining whether ghosting is expected on a photoreceptor and applying power to a laser applied to the photoreceptor based on whether the ghosting is expected.

12 Claims, 5 Drawing Sheets

METHOD AND SYSTEM FOR ACTIVE DECREASE OF GHOST APPEARANCE

RELATED APPLICATIONS

This application is a continuation of U.S. application Ser. No. 12/598,076, filed Oct. 29, 2009 (allowed), which claims priority to PCT No. PCT/US2007/010427, filed Apr. 30, 2007, which applications are commonly assigned and are incorporated in their entirety herein by reference.

FIELD

The present invention relates electro-photography printing devices and more particularly to ghost appearances on prints obtained from electro-photography printing devices.

BACKGROUND

The method of electro-photographic printing is well known in the art. In this method, a photoconductive surface, typically on a drum, is charged to a uniform potential. The charged photoreceptor and/or photoconductive surface are exposed to a light image from, for example, a writing head laser that discharges specific areas on the photoconductive surface. This records an electrostatic latent image on the photoconductive surface. After the photoconductive image is recorded, the latent image is developed. The developed image is then transferred to an intermediate transfer member such as a blanket and subsequently transferred to a substrate, such as paper.

Often, printing the same image repeatedly at the same position causes ghost appearances on subsequent prints due to memory of the previous image. Memory of the previous image may cause variations in the change in potential obtained from exposure to the light image. Such fluctuation may lead to a fluctuation in the development of the latent image. Ghost may occur due to change of surface properties of blanket or photoconductor, like surface energy or roughness, by foreign coating in the image area or background; by deterioration of mechanical properties, like resilience, etc. Typically, developing differences occur between ex-image areas and ex-nonimage areas of the photoconductive surface and/or blanket leading to undesired ghost appearances.

The appearances of ghosts may prompt early replacement of the photoconductive surface and/or the intermediate transfer drum or blanket and thereby increase the print cost.

A known solution that may be implemented for some electro-photography printing devices is use of a seamless drum with a perimeter which is not equal to the print length. In this model, every subsequent image may be shifted on the drum relatively to previous images so that repeated development in the same area may be avoided. This solution may be difficult to implement in large electro-photographic printing, e.g. liquid electro-photographic printing devices that typically use drums with seams or drums on which photoreceptor sheets are mounted.

A similar solution for overcoming ghosts on intermediate transfer members is described in PCT Publication No. WO2007018500 to Hewlett Packard Development Co., entitled "Apparatus And Method For Life Enhancement Of A Print Blanket In Electrostatic Printing", the disclosure of which is incorporated herein by reference. PCT Publication No. WO2007018500 describes an apparatus and method for reducing degradation of a print blanket used in electrophotographic printing by changing an image location and/or orientation during the printing process on the print blanket.

U.S. Patent Application Publication No. 20020044189 to Kenichiro Kitajima et al, entitled "Color Image Forming Apparatus" describes an image forming apparatus including a look-up table for gradational correction of exposure amount to correct for ghost images. When switching from a normal mode to exposure amount reduction mode, the exposure amount is reduced according to the pre-saved data on the look-up table. The exposure amount is reduced on a global basis and is not specific to ex-image and ex-nonimage areas on the latent image.

SUMMARY

An aspect of some embodiments of the invention is the provision of a method to compensate for ghost appearances in ex-image areas on the photoconductive and blanket surfaces of a liquid electro-photography (LEP) printing device.

Photoconductive surfaces may be discharged in image areas by a laser writing beam. The laser writing beam energy or other discharge mechanism implemented for discharging may be adjusted to compensate for ghosting caused by repetitive printing.

According to some embodiments of the present invention, there is provided a method for compensating for poor dot transfer and/or different dot gain due to memory in ex-image areas of the photoconductive and blanket surfaces. In examples of the present invention poor dot transfer and/or negative dot gain may be expressed by reduction in the size of transferred dots and/or lack of transfer of small dots.

According to some embodiments of the present invention, compensation may be provided by increasing the laser writing energy to ex-image areas during printing of subsequent images. Increasing the laser writing energy to specific areas on the photoconductive surface may facilitate increasing the size of the developed dots and thereby compensate for poor transfer in affected areas, e.g. ex-image areas. Alternatively or additionally, the compensation may be provided by otherwise changing the written dot size.

According to some embodiments of the present invention, the laser writing energy to ex-image areas may be controlled by dedicated software embedded in the printing device.

According to some embodiments of the present invention, adjustment to the laser writing energy may be predetermined, for example, predetermined to gradually, increase in ex-image areas as a function of the number of previous printing impressions. In some examples there may be a defined threshold, e.g. a defined number of repeated impressions, below which the laser writing energy is not adjusted. In other examples there may be a defined maximum adjustment level beyond which the laser writing energy may not be increased.

According to some embodiments of the present invention, the level of adjustment to the laser writing energy may be based on pre-determined correlations and/or statistical data. For example, the predetermined data may be based on specific printing conditions, number of printing impressions and/or the level of ghost appearances.

According to yet another embodiment of the present invention, adjustment to the laser writing energy may be determined based on a closed loop control using iterative on-line measurement of the output to determine current adjustment levels. In one example, the optical density of a print may be monitored as a parameter to determine level of adjustment required.

According to one embodiment of the present invention, the closed loop control may be used to reduce the power adjustment in the ex-image areas as the memory fades and/or as the ghosting effect decreases.

According to another embodiment of the present invention, laser writing energy may be adjusted over time and/or as a function of, for example, number of repetitive prints, as a preventive measure prior to detecting ghosting.

An exemplary embodiment of the present invention provides a method to compensate for ghost appearances on a print due to a previous job, the method comprising defining areas in which ghosting is expected and recording the image on a photoreceptor by selectively changing the parameters of the system as a function of position, to compensate for the effects of ghosting in ex-image and ex-nonimage areas.

Optionally, selectively changing the parameters of the system includes selectively changing a power level of a laser writer.

Optionally, selectively changing the parameters of the system includes increasing a power level of a laser writer in the areas in which ghosting is expected.

Optionally, selectively changing the parameters of the system includes changing the parameters of the system as a function of the number of repetitive prints in the previous job.

Optionally, selectively changing the parameters of the system includes changing the parameters of the system as a function of a number of repetitive prints in the previous job.

Optionally, selectively changing the parameters of the system includes changing the parameters of the system as a function of a type of ink used in the previous job.

Optionally, the method additionally comprises determining a threshold corresponding to a number of repetitive prints in the previous job above which the parameters of the system are selectively changed.

Optionally, the method additionally comprises determining a maximum amount by which the parameters of the system can be changed.

Optionally, the method additionally comprises restoring the parameters of the system in a subsequent print.

Optionally, the method additionally comprises restoring the parameters of the system as a function of numbers of subsequent prints.

Optionally, the method additionally comprises storing data relating number of previous repetitive prints, a desired optical density, and a laser power level required to obtain a desired optical density in the areas in which ghosting is expected.

Optionally, the method additionally comprises monitoring optical density in the areas in which ghosting is expected.

Optionally, the method additionally comprises monitoring optical density in areas other than the areas in which ghosting is expected.

Optionally, the method additionally comprises selectively changing the parameters of the system as a function of monitored optical density in the areas in which ghosting is expected.

Optionally, the method additionally comprises detecting a ghost appearance.

Optionally, the method additionally comprises detecting a drop in optical density in a print.

Optionally, the areas in which ghosting is expected are the ex-image areas.

Optionally, the effects of ghosting are discernable as differences in transfer of toner.

An exemplary embodiment of the present invention provides an apparatus to compensate for ghost appearances on a print due to a previous job comprising a laser writer operative to record a latent image on a photoreceptor at a defined laser power level and a controller to selectively change the laser power level as a function of position to compensate for differences in transfer of toner in ex-image and ex-nonimage areas.

Optionally the apparatus additionally comprises a processor to determine the amount at which to change the laser power in a specified position on the latent image.

Optionally the apparatus additionally comprises a memory unit operative to store the position of the ghost prone areas on a latent image.

Optionally the memory unit is operative to store a laser power level of a previous job as a function of position.

Optionally the memory unit is operative to store the type of ink used in a previous job.

Optionally the memory unit is operative to store a threshold corresponding to a number of repetitive prints in a previous job above which the laser power level is to change as a function of position.

Optionally the controller is operative to boost the laser power level in the position corresponding to ghost prone areas.

Optionally controller is operative to change the laser power level up to a maximum allowed change.

Optionally the controller is operative to restore the change in the laser power level as a function of numbers of subsequent prints.

Optionally the processor is operative to determine the change in the laser power level as a function of number of repetitive prints in the previous job.

Optionally the apparatus additionally comprises an in-line densitometer operative to monitor an optical density in a ghost prone area.

Optionally the apparatus additionally comprises an in-line densitometer operative to monitor an optical density in an area other than a ghost prone area.

Optionally the processor is operative to adjust the change in laser power level as a function of measured optical density output in a ghost prone area.

Optionally ghost prone areas are ex-image areas.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description of non-limiting exemplary embodiments, when read with the accompanying drawings in which:

Figure 1A:
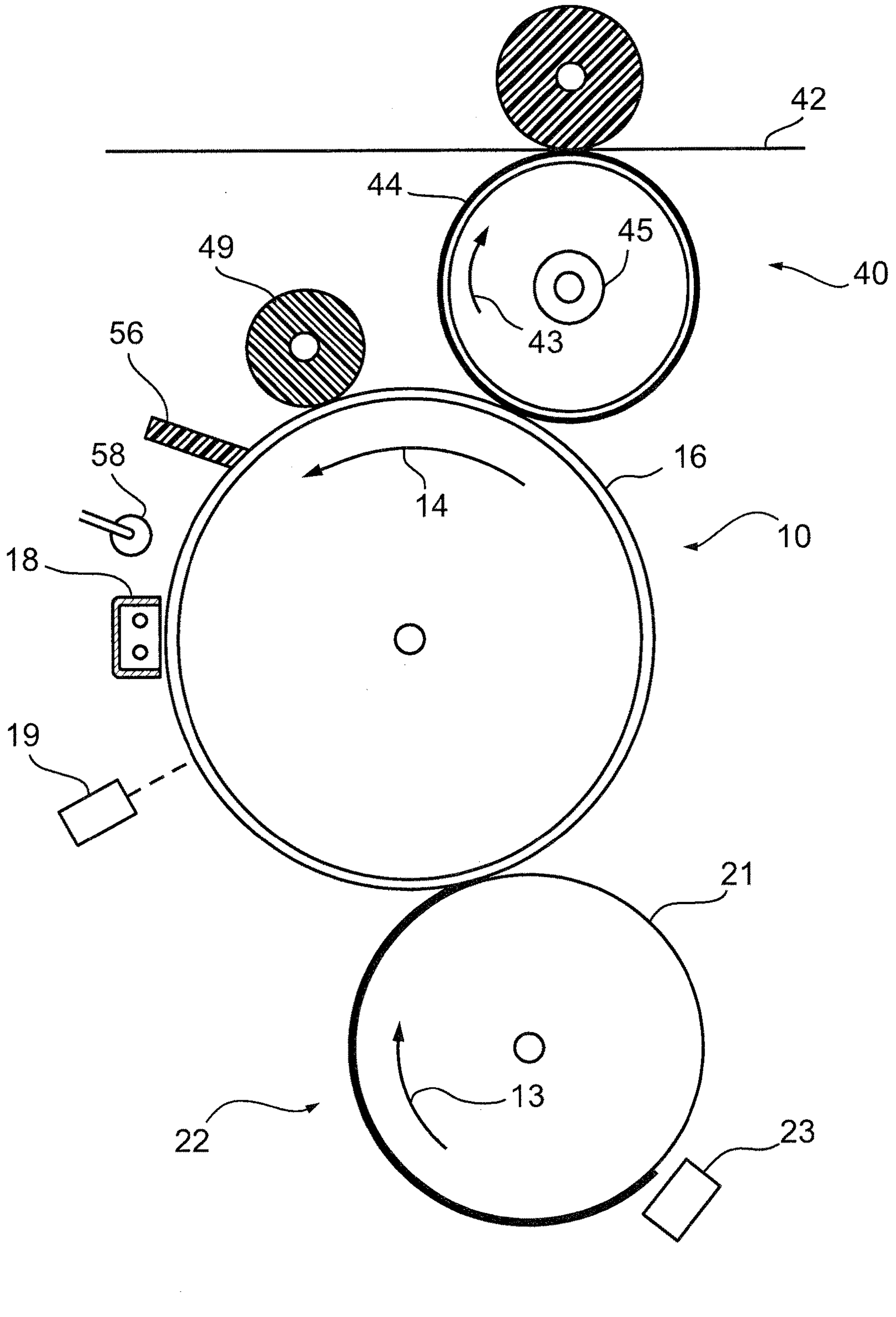
FIG. 1A is a schematic diagram of a known printing device.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, exemplary embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without the specific details presented herein. Furthermore, well-known features may be omitted or simplified in order not to obscure the present invention. Features shown in one embodiment may be combined with features shown in other embodiments. Such features are not repeated for clarity of presentation. Furthermore, some unessential features are described in some embodiments.

Reference is now made to FIG. 1A showing a schematic diagram of a known printing device. The printing device includes a drum 10 preferably having a cylindrical photoreceptor surface 16 made of selenium, a selenium compound, an organic photoconductor or any other suitable photoconductor known in the art. The system shown is a very general system and is merely illustrative. In particular the development system and the cleaning system may be any system known in the art. In particular the development may be by a binary ink development unit as shown in PCT Publication No. WO2006090352 assigned to the common assignee and which is hereby incorporated by reference in its entirety.

During operation, drum 10 rotates in the direction indicated by arrow 14 and photoreceptor surface 16 is charged by a charger 18 to a generally uniformly predetermined voltage, for example, on the order of 1000 volts.

Continued rotation of drum 10 brings charged photoreceptor surface 16 into image receiving relationship with an exposure device such as a light source 19, which may be a laser scanner (in the case of a printer) or the projection of an original (in the case of a photocopier). Light source 19 producing a laser writing beam forms a desired latent image on charged photoreceptor surface 16 by selectively discharging a portion of the photoreceptor surface, the image portions being at a first voltage and the background portions at a second voltage. The discharged portions, for example, may have a voltage of less than about 100 volts.

Continued rotation of drum 10 brings the selectively charged photoreceptor surface 16 into operative contact engagement with a surface 21 of a developer roller 22. Developer roller 22 preferably rotates in a sense opposite that of drum 10, as shown by arrow 13, such that there is substantially zero relative motion between their respective surfaces at the point of contact. Developer roller 22 may be ink coated by coater 23. Coater 23 may be, for example, a generic coater for any binary ink developer unit. Developer roller 22 may be urged against drum 10.

Surface 21 is coated with a thin layer of liquid toner, which may be a very highly concentrated liquid toner. Developer roller 22 may be charged to a voltage which is intermediate the voltage of the charged and discharged areas on photoreceptor surface 16.

When surface 21 bearing the layer of liquid toner concentrate is engaged with photoreceptor surface 16 of drum 10, the difference in potential between developer roller 22 and surface 16 causes selective transfer of the layer of toner particles to surface 16, thereby developing the latent image. Depending on the choice of toner charge polarity and the use of a "write-white" or "write-black" system as known in the art, the layer of toner particles will be selectively attracted to either the charged or the discharged areas of surface 16, and the remaining portions of the toner layer will continue to adhere to surface 21.

The latent image developed may be directly transferred to a desired substrate from the image forming surface in a manner well known in the art. Alternatively, there may be provided an intermediate transfer member 40, which may be a drum or belt and which is in operative engagement with photoreceptor surface 16 of drum 10 bearing the developed image. Intermediate transfer member 40 rotates in a direction opposite to that of photoreceptor surface 16, as shown by arrow 43, providing substantially zero relative motion between their respective surfaces at the point of image transfer.

Intermediate transfer member 40 is operative for receiving the toner image from photoreceptor surface 16 and for transferring the toner image to a final substrate 42, such as paper. Disposed internally of intermediate transfer member 40 there may be provided a heater 45, to heat intermediate transfer member 40 as is known in the art. Transfer of the image to intermediate transfer member 40 is preferably aided by providing electrification of intermediate transfer member 40 to provide an electric field between intermediate transfer member 40 and the image areas of photoreceptor surface 16. Intermediate transfer member 40 includes an intermediate transfer element which may be bonded to the base of the member or, more preferably, in the form of an intermediate transfer blanket 44 mounted on a drum.

Various types of intermediate transfer members are known and are described, for example in U.S. Pat. No. 4,684,238, PCT Publication WO 90/04216 and U.S. Pat. No. 4,974,027, the disclosures of all of which are incorporated herein by reference. However, the present invention is meant as a general solution to the problem of ghosting (especially that caused by poor small dot transfer) and is not dependent on the particular intermediate transfer member used or whether transfer is directly from the photoreceptor to the final substrate or via an intermediate transfer member.

Following the transfer of the toner image to substrate 42 or to intermediate transfer member 40, photoreceptor surface 16 engages a cleaning station 49, which may be any conventional cleaning station. A scraper 56 completes the removal of any residual toner which may not have been removed by cleaning station 49.

In an alternate embodiment, a lamp 58 may be included that may remove residual charge, characteristic of the previous image, from photoreceptor surface 16.

In an alternative embodiment of the invention, reversal transfer is used. In this embodiment, the desired image is formed by the areas of toner concentrate which remain on surface 21 of developer roller 22 after the development of photoreceptor surface 16, and developer roller 22 and not drum 10 which is then brought into operative association with an intermediate transfer member or a final substrate so as to obtain a print of the desired image. Any embodiment of the developer assembly described above may also be used in the context of this embodiment.

Printing the same image in the same position numerous times, may cause developing differences in the physical properties between the ex-image area and ex-nonimage area of the photoreceptor and intermediate transfer member or blanket. For example, the physical properties, e.g. the conductivity, of the photoreceptor and blanket may change, e.g. may temporarily change, in specific areas, e.g. ex-image areas in "write-black" systems. Changes in the properties of the photoreceptor and blanket may depend on number factors, for example, the number of previous repetitive prints, the laser power used in ex-image areas, the age of the photoreceptor and/or blanket, as well as other factors including environmental factors, e.g. temperature or moisture level in the surrounding air. Typically LEPs may include one or more means for maintaining stable conductive properties of the photoreceptor, for example, cleaning station 49, scraper 56, and lamp 58. Such protective means may be less typical for the blanket due to difficulty in correcting for them. As such the blanket may be more prone to accumulation of artifact charges in ghost prone areas, e.g. ex-image areas.

Changes in the conductive properties of either the photoreceptor and/or the blanket due to memory of previous print may be manifested by difficulty in transferring of small dots in ghost prone areas. According to embodiments of the present invention, dots may be transferred with a smaller diameter in ghost prone areas as compared to non-ghost prone areas or a statistically significant percentage of such dots may be not be transferred. The decrease in the size of each dot in the ghost prone area or the decrease in the number of small dots transferred may decrease the percent coverage of an area covered with dots and as such the optical density of the area covered by the dots may be different in ghost prone areas as compared to non-ghost prone areas. In some cases both non-transfer and partial transfer of dots takes place.

The following discussion generally refers to "write-black" systems where ex-image areas are prone to ghost appearances. However, the method and system described herein may also be applicable to "write-white" systems where the ex-nonimage area may be prone to ghost appearances.

Figure 1B:
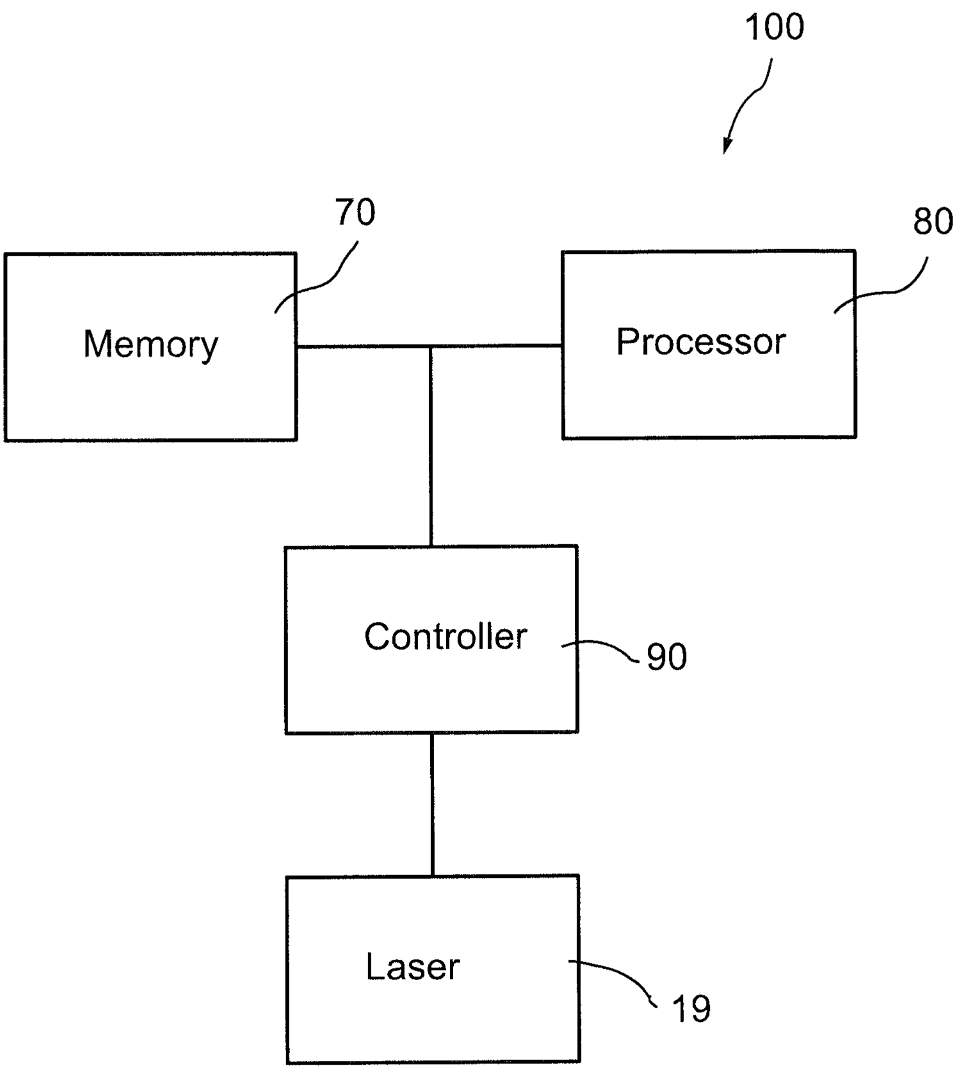
FIG. 1B is a schematic diagram of a laser system for generating an adjustable laser writing beam according to an embodiment of the present invention.

Reference is now made to FIG. 1B showing a schematic diagram of a laser system for generating a laser writing beam, according to an embodiment of the present invention. Laser 19 may be controlled by one or more controllers 90 that may determine the power and the time period at which laser 19 is to emit a beam toward photoreceptor 16. Commands from controller 90 may be processed in processor 80. Memory 70 may store data for example, data relating to previous repetitive prints and/or pre-defined data, e.g. threshold parameters based on which compensation to ghost appearances may be achieved. For example, memory 70 may store the number of repetitive previous prints above which compensation for ghost may commence, the number of prints subsequent to ghosting after which compensation may be terminated, the maximum laser power boost to be used during compensation, the minimum laser energy boost effective for compensation, etc. Memory 70 may also store data defining the relationship between the number of repetitive prints and the level of compensation needed. Memory 70 may also store data defining the spatial location ex-image areas that may potentially lead to ghost appearances. In embodiments of the present invention, processor 80 may obtain data from memory 70 and process commands to control laser 19. In other embodiments processor 80 may additionally obtain data from one or more sensors, e.g. optical density sensor and/or other sensors that may provide feedback regarding the quality of the print. Processor 80 may adjust input to controller 90 based on data sampled from the sensors. Controller 90 may control the laser power used to write the light image as a function of position. Laser power may be boosted in ghost prone areas. In write black systems, such boosting of the power does not discharge the voltage to a much greater degree than does the normal power. However, what it does do is to broaden the discharged area and increase the size of the dot. It should be noted that in some embodiments of the invention the laser power is increased only for small dots. Since larger dots transfer well, no increase in power is required. Single dot size may be, for example, in the range between 20 μm to 60 μm, double and triple dots may be larger.

Figure 2:
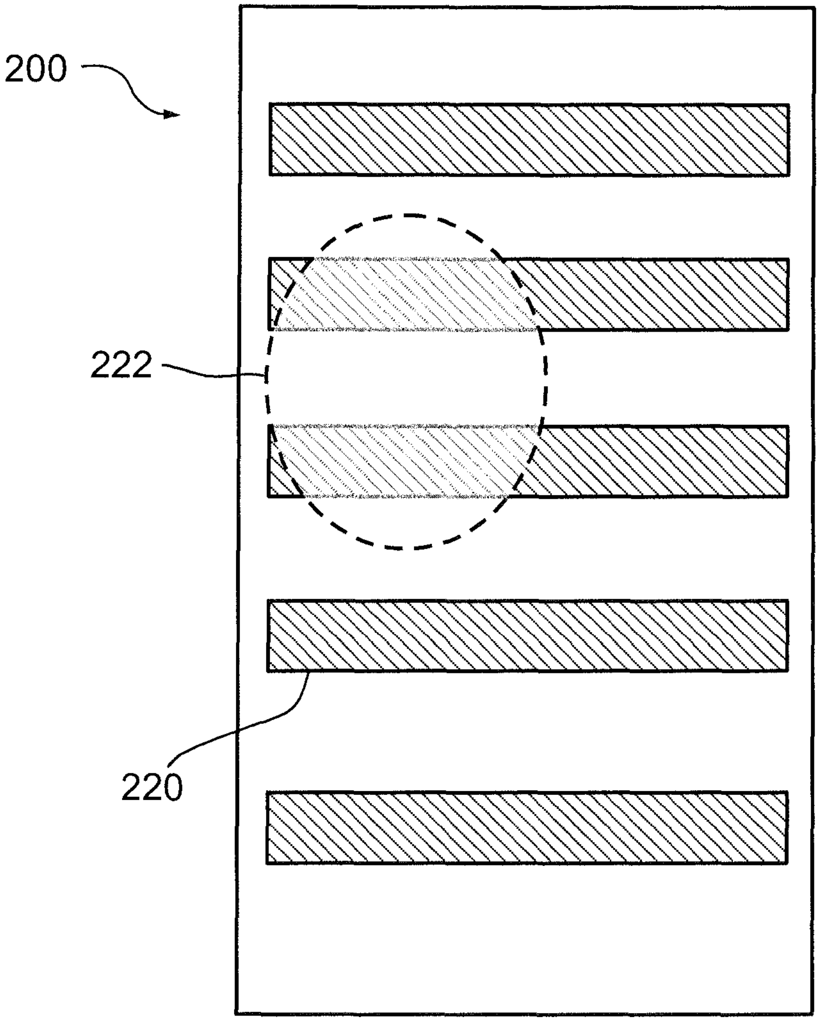
FIG. 2 is a schematic illustration of a print damaged by ghost appearances.

Reference is now made to FIG. 2 showing a sample paper print 200 altered by ghosting in an ex-image area 222. Memory from a previous print imposed an alteration in the optical density in ex-image area 222 having a lower optical density than in ex-nonimage area 220. Damage, e.g. temporary damage to the photoreceptor and/or the blanket in ex-image area may result in transfer of smaller dots and therefore in reduced optical density of the print in ex-image area 222. The change in optical density may be visible. According to embodiments of the present invention, the laser energy used to create a light image on the photoreceptor may be selectively boosted in ex-image (discharged) areas to compensate for ghost appearances.

Figure 3:
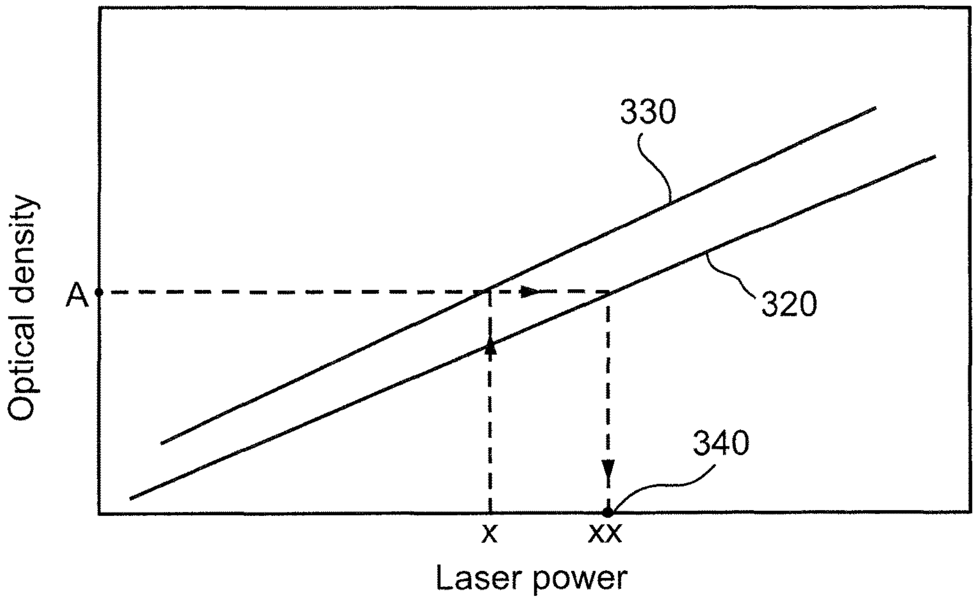
FIG. 3 a sample curve of optical density as a function of laser power in an ex-image area and laser power in an ex-nonimage area after repeatedly printing the same job illustrating the operation of some embodiments of the present invention.

Reference is now made to FIG. 3 showing a sample curve of optical density as a function of laser power in an ex-image area and laser power in an ex-nonimage area after repeatedly printing the same job, e.g. after printing 20,000 impressions of a single job, according to embodiments of the present invention. According to some embodiments of the present invention, the optical density output of an area covered with dots may be less in an ex-image area 320 as compared to the optical density output of an area covered with dots in an ex-nonimage area 330 for a given level of laser power. According to embodiments of the present invention, compensation for lower optical density output in ex-image areas due to ghost appearances may governed by these and/or similar set of curves. For example, compensation may be achieved by increasing the laser power used in ex-image area by an amount indicated by the set of curves shown. For example if an optical density level of 'A' is desired, the laser writing beam may be set at a power level of 'X' in an ex-nonimage area and then adjusted to a boosted power level of 'XX' in an ex-image area to compensate for ghost appearances occurring due to memory from previous printing jobs. Curves 320 and 330 may be a function of the number of previous printing jobs, may be a function of the optical density, color and/or other parameters related to the previous printing jobs and may be used to determine the laser power boost required to maintain the desired optical density (indicated as A on FIG. 3) throughout the entire print. Typically the optical density is determined by an in-line densitometer system that may measure the optical density in one or more positions on the print.

According to other embodiments of the present invention, the optical density may depend on the color of the dots. For example if dark dots are printed over a light background, ghost appearances may decrease the optical density by decreasing the percent area covered by dark dots. However, if light dots or printed over a dark background, ghost appearances may increase the optical density by decreasing the percent area covered by the light dots.

According to one embodiment of the present invention, curves such as 320 and 330, and/or the data that they represent may be obtained by empirical methods and may be pre-programmed in the printer and saved for example in memory 70 (FIG. 1A). For example, the printer may store look-up tables based on pairs of curves similar to curves 320 and 330 that may specify the laser power boost required for a specific condition, e.g. ghost appearances after printing 20,000 impressions of a job at a 50% gray level. Similar curves and/or look-up tables may be stored for ghost appearances after printing 30,000 impressions, 40,000 impression, etc. In one examples, compensation may be provided for a smaller number of repetitive prints, e.g. in the order of magnitude of tens of prints, or hundreds of prints. The curves may also be a function of the optical density of the previous print.

Figure 4:
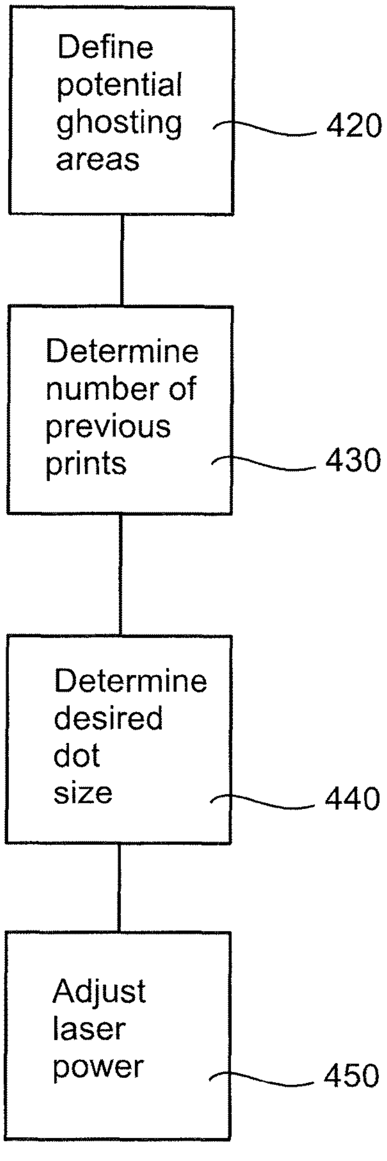
FIG. 4 is a flow chart describing a method for compensating for ghost appearances according to an embodiment of the present invention.

Reference is now made to FIG. 4 showing a sample method for compensating for ghost appearances according to an embodiment of the present invention. According to one embodiment of the present invention, detection of a ghost appearance may be manual, e.g. a user may visually detect ghost appearances on a sample print and may input a request to compensate for ghost appearance. Compensation upon receiving the request may be performed automatically by the printer, e.g. without user intervention. The printing system may define potential ghosting areas (block 420) based on saved data from prior printing jobs, e.g. data saved in memory 70 (FIG. 1A) indicating ex-image areas. The number of prints in the previous job may be recalled (block 430) and the level of compensation may be directly related to the number of prints of a previous job and/or other factors relating to the previous job, e.g. optical density or color. The desired dot size may be determined (block 440). According to some embodiments of the present invention, the level of compensation may depend on the desired size of the dots. In one example, more compensation may be required for printing small dots in ex-image areas as compared to printing large dots in ex-image areas. In other examples, no compensation may be required for specific (generally larger) dot sizes. According to some embodiments of the present invention, the level of compensation may be determined based on statistical data of reduced transfer for different size dots. Processor 80 may process relevant data, e.g. statistical data and/or determined correlations to determine the level of compensation required to meet the desired optical density. For example, relationships such as the curves described in FIG. 3 may be used to determine the adjustment level required in ex-image areas. Controller 90 may selectively adjust the laser power used to emit the writing laser beam (block 450) in the specified ghost prone areas while maintaining the original and/or normal laser power used to emit the writing laser beam in areas not selected as prone to ghosting, e.g. ex-nonimage areas.

Figure 5:
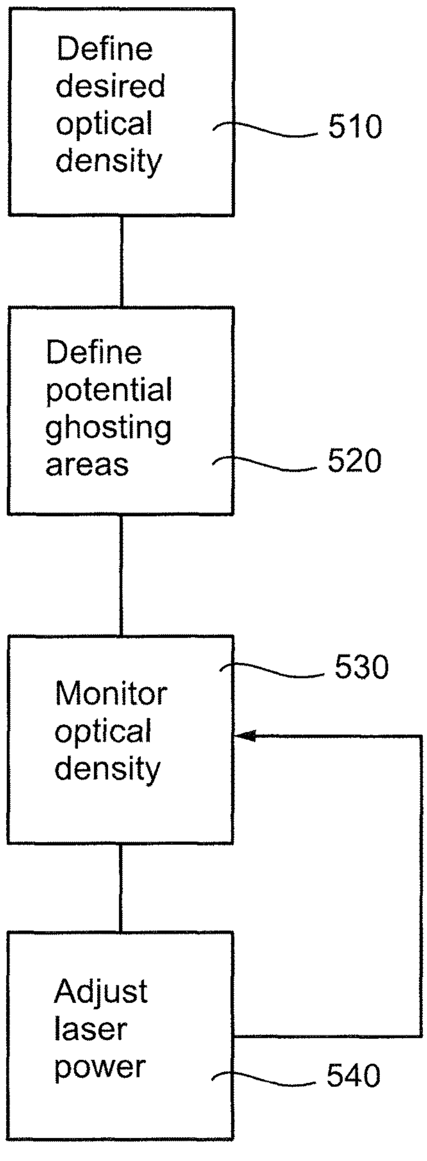
FIG. 5 is a flow chart describing a closed loop method for compensating for ghost appearances according to embodiments of the present invention.

Reference is now made to FIG. 5 showing a flow chart describing a closed loop method for compensating for ghost appearances according to embodiments of the present invention. According to some embodiments of the present invention, compensation for ghost appearances may be performed automatically without user intervention. For example, a desired optical density for a print may be defined (block 510). Based on saved data, potential ghosting areas, e.g. ex-image areas may be defined (block 520). One or more optical density sensors may sense the optical density in potential ghosting areas (block 530) as well as in other areas, e.g. ex-nonimage areas. Based on the sampled output from the sensors the laser power may be adjusted, e.g. boosted. Sometimes, due to poor second transfer, for example, image area of blanket may accumulate ink residuals which may be removed by subsequent printing. Continued monitoring may facilitate reducing the laser power boost and/or restoring the laser power level as the memory fades. Ghost appearances and therefore the need to compensate for them may diminish over time and/or as a function of a number of subsequent prints. According to some embodiments of the present invention, reduction and/or change of the laser power boost may be performed either gradually at a pre-defined rate and/or the laser power boost may be cancelled in one shoot after a pre-defined number of subsequent prints and/or after a pre-defined time period. According to one embodiment of the present invention, laser power level boost may be restored as a function of time either gradually or at a predefined time. According to another embodiment of the present invention, laser power level boost may be restored as a function of numbers of subsequent prints. According to yet another embodiment of the present invention, laser power boost may be restored as a function of both time and subsequent prints.

According to one embodiment of the present invention, laser power adjustment in ex-image areas may be governed by curves similar to those described in reference to FIG. 3. For example, a set of curves may be defined for a range of repetitive prints. For example, the set of curves shown in FIG. 3 may define the relationship between optical density and laser power in ex-image areas and ex-non-image areas after 20,000 repetitive prints of a previous job. Other curves may be defined for 10,000 repetitive prints, 30,000 repetitive prints, 40,000 repetitive prints, etc. In other examples, curves may be defined for repetitive prints in the order of magnitude of ten and/or one hundred. The relationship between optical density and laser power in ex-image areas and ex-non-image areas may also depend on optical density of the previous repetitive prints, color of the previous print, type of toner used in the previous print and/or on other related parameters.

In other embodiments, levels of laser power boosting options may be pre-set at a low, medium, or high compensation levels. The setting may be chosen by the user based on visual inspection of the ghost appearances, by a control feedback loop that includes detecting optical density in ex-image areas or automatically based on the printing history and the size of the dots to be transferred. In one example, upon appearance of ghosting, laser power boosting may be set at a high compensation level and then over a number of prints reduced to medium, low and finally no compensation. Other number of levels may be defined.

According to embodiments of the present invention, the laser system may be calibrated at an initial calibration where there is no ghosting, e.g. a clean system, and the laser system may adjust the laser power in ex-image areas over time with repetitive printing.

According to other embodiments of the present invention, the laser system may be calibrated at a boosted level and the laser power may be reduced in ex-nonimage areas.

Compensation for ghost appearances as may be described herein may facilitate increasing the supply life of the blanket and photoreceptor in digital printing presses without requiring developing improved supplies, e.g. improved materials for photoreceptor and blanket, and/or implementing special hardware. Implementation of the system and method described herein is cost effective for both new presses and for existing field updates. Longer supply life may decreases cost per page and improve total cost of expenditures by decreasing time and cases of dealing with supply replacements.

It should be further understood that the individual features described hereinabove can be combined in all possible combinations and sub-combinations to produce exemplary embodiments of the invention. The examples given above are exemplary in nature and are not intended to limit the scope of the invention which is defined solely by the following claims.

The terms “include”, “comprise” and “have” and their conjugates as used herein mean “including but not necessarily limited to”.

What is claimed is:

1. A method of operating a printing system, comprising:

determining whether ghosting is expected on a photoreceptor; and applying power to a laser, applied to the photoreceptor, based on whether the ghosting is expected, including applying increased power to the laser when the laser is applied to a portion of the photoreceptor where ghosting is expected as compared to when the laser is applied to a portion of the photoreceptor where ghosting is not expected, and determining a desired dot size and adjusting the power applied to the laser based on the desired dot size.

2. The method of claim 1, wherein determining whether ghosting is expected on the photoreceptor comprises determining whether ghosting is expected on the photoreceptor based on a number of prints or an optical density.

3. The method of claim 1, further comprising sensing an optical density on a portion of the photoreceptor where ghosting is expected and increasing the power applied to the laser based on the sensed optical density when the laser is applied to the portion of the photoreceptor where the ghosting is expected.

4. The method of claim 1, wherein adjusting the power applied to the laser based on the desired dot size comprises increasing the power applied to the laser for printing small dots as compared to printing large dots.

5. A printing system, comprising:

a photoreceptor;

a laser; and a controller to cause the printing system to apply a power boost to the laser when the laser is applied to a portion of the photoreceptor where ghosting is expected, wherein the controller is to cause the printing system to reduce the power boost applied to the laser at least one of at a certain time after the power boost is applied to the laser or when a certain number of prints occur after the power boost is applied to the laser.

6. The printing system of claim 5, wherein the printing system is to store data that specifies the power boost to be applied to the laser when ghosting is expected.

7. The printing system of claim 5, wherein the printing system is to store a threshold number of repetitive previous prints above which the controller is to cause the printing system to apply the power boost to the laser.

8. A printing system, comprising:

a photoreceptor;

a laser;

a processor to determine an increased amount of power to apply to the laser for a particular area on the photoreceptor based on whether ghosting is expected for the particular area; and a controller to cause the printing system to apply the determined increased amount of power to the laser when the laser is applied to the particular area.

9. The printing system of claim 8, further comprising a sensor, wherein the processor is to determine the increased amount of power to apply to the laser based on data from the sensor.

10. The printing system of claim 8, wherein the processor is to determine a change in the amount of power to apply to the laser as a function of a number of repetitive previous prints.

11. The printing system of claim 8, further comprising a memory storing look-up tables that specify power boosts to be applied to the laser to establish the increased amount of power to apply to the laser when ghosting is expected.

12. The printing system of claim 8, wherein the processor is to determine a difference between an amount of power to apply to the laser for the particular area for a desired optical density when ghosting is not expected for the particular area and an amount of power to apply to the laser for the particular area for the desired optical density when ghosting is expected for the particular area, and wherein the controller is to cause the printing system to boost the amount power applied to the laser by the determined difference when the laser is applied to the particular area when ghosting is expected for the particular area.

* * * * *